Patented Oct. 7, 1941

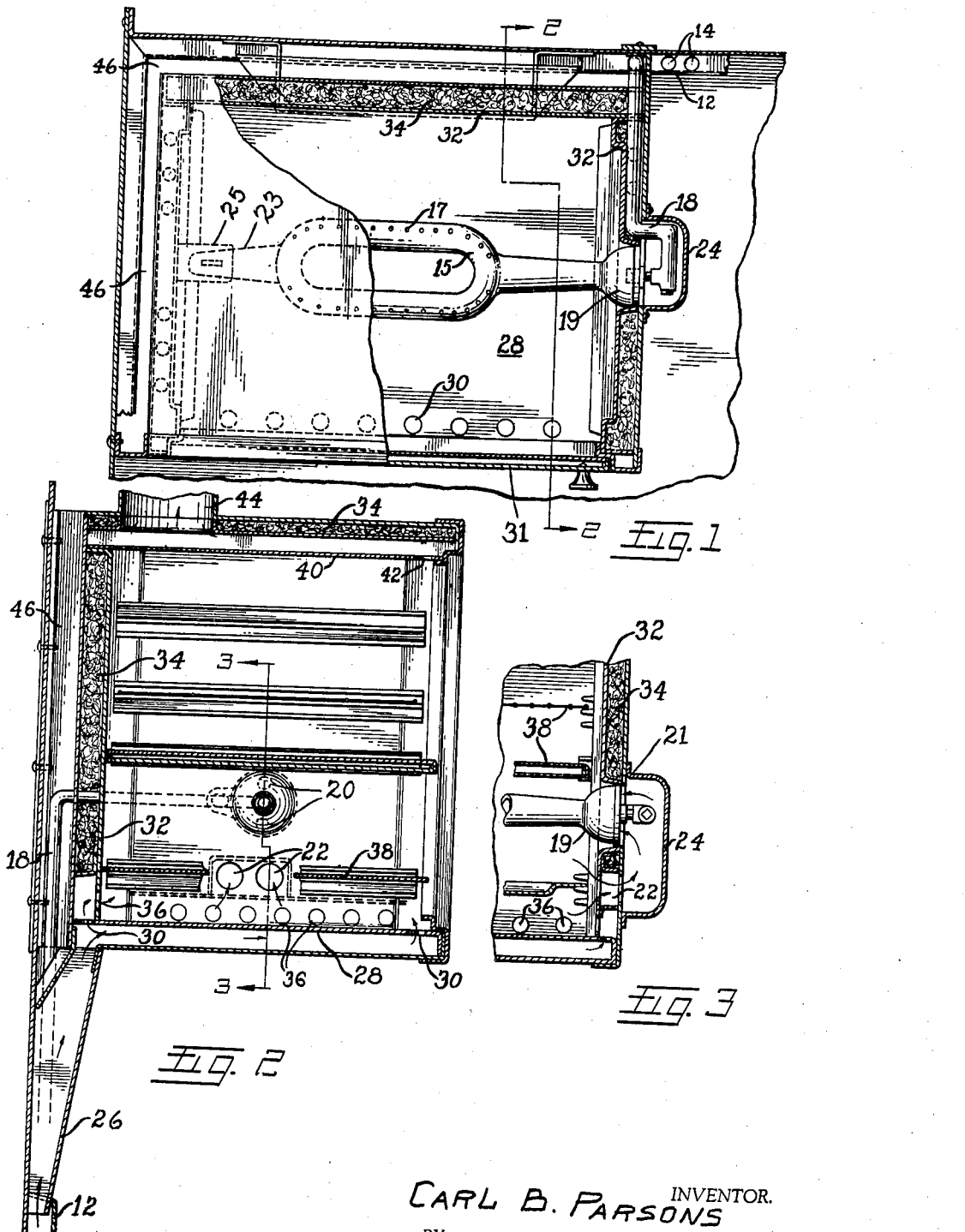

2,257,888

UNITED STATES PATENT OFFICE 2,257,888

KITCHEN CABINET

Carl B. Parsons, Detroit, Mich.

Original application July 31, 1936, Serial No. 93,600. Divided and this application September 29, 1939, Serial No. 295,806

2 Claims. (Cl. 126—39)

This invention relates to improvements in oven structures provided with gas burners and particularly to an oven structure such as is used in a kitchen cabinet of the character disclosed in my application Serial No. 93,600. This application is a division of the aforementioned application which was filed on July 31, 1936.

An object is to provide an oven structure provided with a gas burner of simple and inexpensive design and which is so constructed that a gas burner will continue to operate effectively and the gas jets will not be blown out through opening and closing of the oven door.

An important feature is the provision of a gas burner having an intake end portion through which gas fuel and air is taken for purposes of combustion, which intake end portion is surrounded by a chamber that is opened to receive air for combustion from the interior of the oven through an opening in the oven wall.

More particularly, this intake end portion of the burner is seated with an opening formed in a side wall of the oven, which oven side wall is preferably jacketed and insulated, and the chamber is supported by and projects from the oven wall surrounding this end portion of the burner and communicates through a permanently opened air passageway that extends through the oven wall and is adapted to conduct air from the interior of the oven into the chamber.

The burner is preferably situated in the oven spaced above the bottom wall thereof and the oven is provided with atmospheric air openings leading thereinto through the side walls and jacketed bottom wall adjacent to the interior bottom wall of the oven. The chamber which surrounds the intake end portion has a permanently opened air passageway thereinto that communicates with the interior of the oven above the atmospheric air openings into the oven through the side walls and below the burner.

An advantage of this invention is that the air pressure within the inside of the burner is equalized with the air pressure from the burner jets so that if the oven door is slammed shut this equalization of air pressure will prevent blowing out of the gas flame which might otherwise result from a sudden closing of the door in an oven of restricted capacity.

Other objects, advantages, and meritorious features of my invention will more fully appear from the following description, appended claims, and accompanying drawing, wherein:

Figure 1 is a plan view of my improved oven partly broken away on a horizontal line, Fig. 2 is a sectional view taken on line 2—2 of Fig. 1, and Fig. 3 is a sectional view taken on line 3—3 of Fig. 2.

The oven here shown is one such as is used in a kitchen cabinet structure and is naturally of a restricted capacity. It is supported within the cabinet in a suitable manner and is provided with a gas burner 15 having the usual gas jet discharge opening 17. This burner is supported within the lower portion of the oven spaced above the floor. It has an intake end portion 19 which is disposed within a recess or opening in a side wall of the burner such as 21, as shown in Fig. 3. The burner is provided at its opposite end with an extension 23 supported upon a bracket or the like 25 from the opposite side wall of the burner. This burner is supplied with gas through a gas fuel line 18. Air is adapted to enter the intake end of the burner and the gas intake opening thereinto through apertures 20 shown in dotted line in Fig. 2. Direction of the air flow is shown by the arrows in Fig. 3. This air enters the intake end of the burner in the direction of the flow of gas and the gas fuel line 18 is provided with a jet of conventional construction which is adapted to create a pressure which will draw the air into the burner, the air and gas mingling as it enters the burner for combustion.

The air which enters the burner is taken from the interior of the oven as shown in the figures of the drawing. The air intake into the oven is through passageways 12 and 26 into the jacketed bottom wall of the oven. It will be noted that the oven is provided with jacketed top and bottom walls and jacketed side walls. There is an inner bottom wall 28 spaced above the outer bottom wall and the inner bottom wall provided with air passageways 30. These perforations extend along the margin of the bottom wall on all sides. On the front adjacent the oven door 31 they open directly into the interior of the oven; along the back and ends of the oven they open into a jacketed side wall portion as shown particularly in Fig. 2. Each side wall of the oven is provided with an inner side wall member 32 spaced inwardly from the outer side wall of the oven. This space between the inner and outer side wall is normally filled with insulation 34. This insulation does not extend entirely to the bottom wall 38 but as shown in Fig. 2 a space is left into which these openings 30 of the bottom wall lead.

The inner side walls 32 are provided with perforations 36 adjacent the floor of the oven and which perforations open into the interior of the oven leading thereinto from the space above referred to. The air thus entering the oven after it has passed over the gas burner jets and the several open shelves, which may be provided within the oven in number and form as desired, escapes through the apertures 42 formed in the ceiling 40 of the oven. This ceiling 40 is an inner ceiling spaced below the top of the oven and below the insulation therein which extends along the top as shown in Fig. 2 and is held up above the ceiling to provide an air passageway thereunderneath. This ceiling 40 and the inner side walls 32 may be provided with flanges or webs that space these wall parts from the outer wall parts to provide air passageways or insulation spaces as illustrated.

The oven is provided with an exhaust gas and air passageway or flue 44 which conducts the hot air and exhaust gas from the space above the ceiling 40 to a point of discharge.

As heretofore set forth, the intake end portion 19 of the burner is disposed within an opening or recess 21 in a side wall of the oven and the chamber 24 is provided which is supported upon the side wall of the oven projecting therefrom and forms a chamber covering said opening through the side wall and surrounding the intake end portion of the burner. This chamber 24 communicates through a permanently opened air passageway 22 with the interior of the oven above the air intake openings 36 into the oven and below the gas burner as shown in Figs. 2 and 3. The gas fuel line 18 also leads into this chamber 24 as shown in Figs. 1 and 3 and has a discharge jet adapted as hereinabove set forth to direct the gas fuel stream toward the intake end of the burner. Due to this construction the chamber 24 is permanently opened to receive air from the interior of the oven and communicates with the gas burner so that the air supplied thereto is received from the interior of the oven and so that the pressure within the burners is equalized with the external pressure upon the burner jets. In this way if the oven door should be suddenly slammed shut creating an excess air pressure in the oven this pressure would be equalized both within and without the burner so that the gas jets would not be blown up.

What I claim:

1. An oven having a top wall, a bottom wall, side walls, and an oven door, said top wall having an upper jacketed space filled with insulation and a lower jacketed air space, said bottom wall being jacketed throughout providing an air space throughout, each side wall being jacketed throughout and having a partition separating a relatively narrow portion extending along its bottom margin adjacent to the bottom wall from the portion thereabove, the jacketed portion above the partition being filled with insulation material, the jacketed portion below the partition constituting an air space, a plurality of air openings leading from the air space of the bottom wall into the air space of each side wall, a plurality of air openings leading from the air space of each side wall into the interior of the oven immediately above the bottom wall, said jacketed top wall provided with air passageways leading from the interior of the oven into its air space, an air exhaust leading from said air space of the jacketed top wall, a gas burner supported within the oven spaced above said jacketed air spaces of the side walls and having an intake end portion provided with gas and air intake openings, said end portion being seated within an opening formed in one side wall of the oven above the partition of said side wall with its intake openings disposed exteriorly of said wall, a gas fuel line leading to and having a discharge jet adapted to direct a gas stream into the gas intake opening of said end of the burner, an air passageway through said side wall of the oven from the interior thereof below the intake end portion of the burner, and a housing outwardly of said side wall enclosing the intake end of the burner and the air passageway through said wall below said end of the burner.

2. An oven having jacketed top and bottom walls providing an air space throughout the area of each and having an oven door, said oven having jacketed side walls, each jacketed side wall filled with insulation from the top down to within a short distance from the jacketed bottom wall providing a jacketed air space between said insulation and the bottom wall extending for the width of the side wall, an atmospheric air intake into the air space of the jacketed bottom wall, an air exhaust leading from the air space of the jacketed top wall, a plurality of air passageways leading from the air space of the jacketed bottom wall into the jacketed air space of each side wall, a plurality of air passageways leading from the air space of each jacketed side wall along the bottom wall into the interior of the oven, a gas burner supported within the oven spaced above said air intake openings and having an intake end portion provided with gas and air intake openings, said end portion being seated within an opening formed in one side wall of the oven above its jacketed air space area, an enclosure covering said opening in the side wall and forming a chamber surrounding the intake end portion of the burner and communicating therewith and provided with a permanently open air passageway leading thereinto through said side wall of the oven from the interior of the oven and above the jacketed air space of said side wall, and a gas fuel line leading into said chamber and provided with a jet adapted to direct gas fuel into the gas intake opening of the burner.

CARL B. PARSONS.